Figure 1:
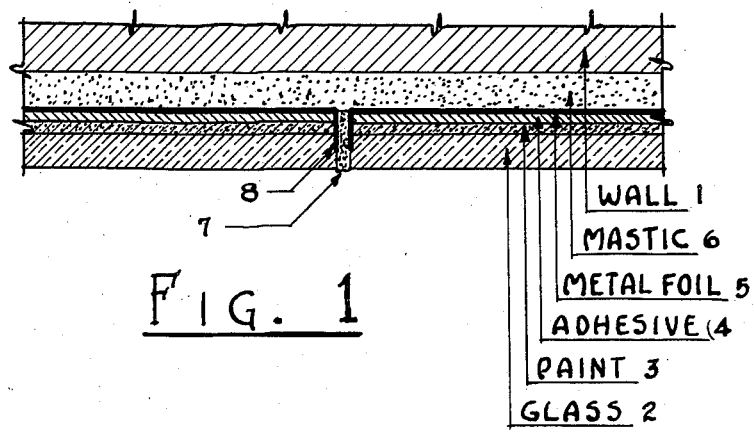

Oct. 12, 1937.  E. B. SCHULER  2,095,269

DECORATED TRANSPARENT SHEET

Filed Aug. 30, 1934

INVENTOR
ELMER B. SCHULER
BY Milton Zucker
ATTORNEY

Patented Oct. 12, 1937

2,095,269

UNITED STATES PATENT OFFICE 2,095,269

DECORATED TRANSPARENT SHEET

Elmer B. Schuler, Lakewood, Ohio, assignor to The Glidden Company, Cleveland, Ohio, a corporation of Ohio Application August 30, 1934, Serial No. 742,113

6 Claims. (Cl. 72—18)

This invention relates to the decoration of surfaces, and has particular reference to a new and novel method for protecting the backs of decorated transparent or translucent surfaces, such as glass and the like, against the action of water vapor and the solvent action of a setting mastic. In particular, it contemplates the use of metallic foil for such purpose.

It has been proposed to make tile from glass, and similar transparent and translucent bodies, by coating the glass with a colored coating material such as paint, lacquer or other enamel; the tile is set with the glass side out, the glass protecting the paint against exposure and wear. A mastic is necessary, of course, for setting the glass. The cheapest of the satisfactory mastics that have been available are bituminous base materials; oil base mastics have likewise been tried. Unfortunately, both types of plastics bleed through the paint, the bituminous type resulting in dirty, brown blotches, while the oil type gives an oily, translucent effect.

Attempts to protect the painted surface of the glass against bleeding of the mastic have heretofore met with little success. Ordinary paint, varnish and lacquer coatings are useless; shellac and similar alcohol soluble resins, while an improvement, do not solve the problem. Casein, glue, and similar water soluble coatings seal; but they do not form a continuous film, due to poor adhesion and flexibility. I have found that the adhesion and flexibility can be improved to a sufficient degree to get fairly good sealing, by the use of a proper resin-plasticizer; but unfortunately, the use of the combination coating presents still another difficulty.

Ceramic tile, and any proposed substitutes, are intended largely for use in kitchens, bathrooms, and the like, where moisture and waterproofness are prime essentials. The satisfactory sealers, made from casein, etc., plus resin-plasticizer, yield hygroscopic films. When tile made with these sealers is exposed to high humidity, the coating picks up water, and the appearance of the paint film is destroyed; in some cases, the film will separate from the glass.

Attempts to harden the sealer, to render it non-hygroscopic, such as by treatment with formaldehyde, have helped somewhat, but not sufficiently to render the finished tile satisfactory.

I have discovered that by covering the back of the painted glass with metallic foil, not only is the paint sealed perfectly against bleeding of the mastic, but the waterproofness of the finished article is improved considerably. In addition, the metallic film protects the paint film against accidental contact with alkali (which may be present in walls), should the mastic at any point be so thin as to permit direct contact of the tile with the wall.

Any sort of metallic foil may be used, such as lead, aluminum or tin foil, etc., and the thickness may be varied at will; but from the point of view of economy, to get maximum strength with minimum cost, I prefer to use aluminum foil of about 0.001 inch thickness.

In order to get adhesion between the foil and the paint coated glass, the foil may be applied to the paint while it is still tacky. I prefer, however, in order to get thorough drying of the paint and the best possible adhesion, to bake the paint coating, and unite the foil to it by means of a special adhesive. For this purpose practically any adhesive will work. Because of the objection to water soluble products in the composite article, I prefer to use an oleaginous or resinous adhesive, rather than a water soluble material. I have found that a short oil varnish, or a plastic resin solution, give excellent results. For example, a 7½ gallon Congo wood oil varnish reduced to 50% solids with varnolene (body E on Gardner-Holdt scale), such as is ordinarily used for wood finishing, gave excellent adhesion; while a mixture comprising 5¼ volumes of a 67% solution of plastic phenol-aldehyde resin in xylol, and 2¾ volumes of a 50% solution of phenol resin modified rosin ester gum in xylol gave very superior results over an alkyd resin paint coating which was dried thoroughly by baking.

Figure 2:
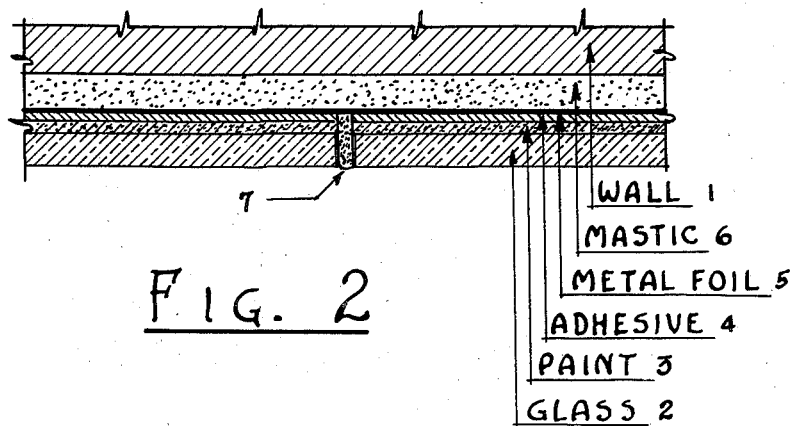

The preferred application of my invention may be best understood by referring to the accompanying drawing, in which Figure 1 shows the preferred form of my invention, in cross-section Figure 2 shows an alternate form.

The glass (2) or similar material which is the base of the tile, is coated on one side with a coating (3) of paint or other enamel. After drying the enamel, an adhesive (4) is applied; and then a sheet of metal foil (5) is applied to the coated glass by rolling or otherwise to get a smooth surface. Preferably I dispose the foil to seal not only the back of the paint, but also the sides, as shown at (8), although this is not essential when a proper enamel is used. The finished tile is then ready for application to the wall (1); this is accomplished by embedding in a mastic (6). The wall may then be finished by applying to the joints a pointing compound (7) of any desired type.

While the metal foil in the preferred form of my invention, as shown in Figure 1, protects the sides of the panels against bleeding from either the mastic (6) or the pointing compound (7), the overlapping sides (8) of metal tend to cast a shadow into the glass, and give a gray effect. It is sometimes desirable to merely cover the back of the paint, as shown in Figure 2, and take care in setting the tile, using a pointing compound (7) which will hold back the mastic, and will not in itself bleed into the tile.

As stated above, almost any sort of enamel may be used without departing from the spirit of my invention, but I prefer to use a baked coating. Lacquer enamels, air dried, may be used, but their adhesion is poor. I have used ordinary oil enamels, such as are used for a variety of purposes, with fair success. Modified phenolic resin varnishes have proven to be superior to the ordinary oil varnishes, from the standpoint of adhesion; but I have secured best results on glass by the use of enamels made with alkyd resin vehicles. A resin made from glycerol, phthalic anhydride and linseed oil acids, having about 50% of oil and 50% of glycerol phthalate in the molecule, is a satisfactory vehicle: and enamels can be compounded in any manner well known to the art. Care should be taken that the enamel hides well enough to thoroughly prevent the visibility of the metal, in order to insure uniformity of color.

The pointing compound may be of any type, either oil base, or an inorganic cement, as may be desired. In using the modification shown in Figure 2, I prefer to employ a cement pointing compound, to minimize bleeding.

The adhesive used may be of any desired type, as indicated above; the composition and thickness of foil may likewise be varied without departing from the spirit of this invention; and the type of enamel may be picked from a wide range. The material used may be any transparent or translucent material which will protect the front of the paint, and permit it to be seen— glass is particularly adaptable for this purpose, although other similar surfaces could be so used.

While devised particularly for the purpose indicated, my tile is not restricted in use to the particular purpose set forth, but may be used elsewhere, where a moistureproof coated film is to be used. However, in any event, the film on the back of the glass should be protected from excessive mechanical action, to prevent disruption thereof.

In the claims, the term "pigmented enamel" means an enamel as understood in the coating art, i. e.—a fine dispersion of a pigment in a coating composition, as distinguished from the term "enamel" as used in the field of ceramics.

I claim:

1. An article of manufacture comprising a body of transparent material, a coating of pigment enamel normally susceptible to discoloration by bleeding when exposed to bituminous materials on one side thereof, and a layer of metallic foil attached to the enamel coating.

2. A waterproof tile for setting in a mastic comprising a sheet of glass, a coating of pigmented enamel on the reverse side thereof normally susceptible to discoloration by bleeding when exposed to bituminous materials, and a layer of metallic foil attached to said enamel to protect it against the discoloring action of the mastic.

3. The article of claim 2 in which the foil is attached to the enamel by an adhesive.

4. The article of claim 2 in which the enamel is a pigmented alkyd type coating.

5. A set tile surface comprising a surface, a mastic on said surface which bleeds into paint enamels, and a tile set in said mastic comprising a sheet of glass, a coating of pigmented enamel on the reverse side thereof normally susceptible to discoloration by bleeding when exposed to the mastic, and a layer of metallic foil attached to said enamel to protect it against the discoloring action of the mastic, and against moisture.

6. The surface of claim 5 in which the mastic is bituminous.

ELMER B. SCHULER.